US010167236B2

(12) United States Patent
Ledoux

(10) Patent No.: US 10,167,236 B2
(45) Date of Patent: Jan. 1, 2019

(54) METHOD FOR PROVIDING AN INORGANIC COATING TO AMMONIUM NITRATE-BASED PARTICLES

(71) Applicant: YARA INTERNATIONAL ASA, Oslo (NO)

(72) Inventor: Francois Ledoux, Cormeilles en Parisis (FR)

(73) Assignee: YARA INTERNATIONAL ASA, Oslo (NO)

( * ) Notice: Subject to any disclaimer, the term of this patent is extended or adjusted under 35 U.S.C. 154(b) by 95 days.

(21) Appl. No.: 15/122,756

(22) PCT Filed: Mar. 3, 2015

(86) PCT No.: PCT/EP2015/054424
§ 371 (c)(1),
(2) Date: Aug. 31, 2016

(87) PCT Pub. No.: WO2015/132261
PCT Pub. Date: Sep. 11, 2015

(65) Prior Publication Data
US 2017/0066692 A1 Mar. 9, 2017

(30) Foreign Application Priority Data
Mar. 3, 2014 (NO) .................................. 20140271

(51) Int. Cl.
*C09D 1/00* (2006.01)
*C05C 1/00* (2006.01)
(Continued)

(52) U.S. Cl.
CPC .................. *C05C 1/02* (2013.01); *B01J 2/30* (2013.01); *C05B 17/00* (2013.01); *C05C 1/00* (2013.01);
(Continued)

(58) Field of Classification Search
None
See application file for complete search history.

(56) References Cited

U.S. PATENT DOCUMENTS 3,392,007 A 7/1968 Christoffel et al.
3,419,379 A 12/1968 Goodale et al.
(Continued)

FOREIGN PATENT DOCUMENTS

FR 2 686 861 8/1993
JP 2002-316888 10/2002
(Continued)

OTHER PUBLICATIONS

International Search Report dated May 19, 2015 in International (PCT) Application No. PCT/EP2015/054424.
(Continued)

*Primary Examiner* — Wayne A Langel
(74) *Attorney, Agent, or Firm* — Wenderoth, Lind & Ponack, L.L.P.

(57) ABSTRACT

The invention relates to a method for providing an inorganic coating to ammonium nitrate (AN) based particles, in particular to ammonium nitrate-based particles for use as a fertilizer, as well as to an inorganic coating for ammonium nitrate-based particles per se. The method comprises the steps of: a) applying a liquid concentrated mineral acid with a water content of less than 50 weight %, to the particles, in order to at least solubilize ammonium nitrate at the outer surface of the particles such that an acidified particle grasping layer is obtained, and b) applying a solid mineral alkaline in powder form to the particles of step a) in order to react with the grasping layer of the particles to coat the acidified particle surface; wherein the stoichiometric ratio of solid mineral alkaline in powder form to concentrated mineral acid is equal to or more than 5:1.

20 Claims, 2 Drawing Sheets

(51) Int. Cl.
*C05G 3/00* (2006.01)
*C05C 1/02* (2006.01)
*C05D 9/02* (2006.01)
*B01J 2/30* (2006.01)
*C05B 17/00* (2006.01)

(52) U.S. Cl.
CPC ............. *C05D 9/02* (2013.01); *C05G 3/0041* (2013.01); *C05G 3/0088* (2013.01); *C09D 1/00* (2013.01)

(56) References Cited

U.S. PATENT DOCUMENTS

| | | | | |
|---|---|---|---|---|
| 3,423,199 | A * | 1/1969 | Julius | ............. C05B 13/06 427/212 |
| 2008/0098781 | A1 * | 5/2008 | Lylykangas | ............... C05C 1/00 71/11 |
| 2010/0031719 | A1 * | 2/2010 | Hero | ......................... C05C 1/02 71/30 |
| 2015/0376076 | A1 * | 12/2015 | Ward | ...................... C05D 9/02 71/23 |

FOREIGN PATENT DOCUMENTS

| | | |
|---|---|---|
| WO | 93/10062 | 5/1993 |
| WO | 99/15480 | 4/1999 |

OTHER PUBLICATIONS

Written Opinion dated Mar. 24, 2016 in International (PCT) Application No. PCT/EP2015/054424.
International Preliminary Report on Patentability dated Jun. 6, 2016 in International (PCT) Application No. PCT/EP2015/054424.
Reply to Written Opinion dated Dec. 29, 2015 in International (PCT) Application No. PCT/EP2015/054424.

* cited by examiner

METHOD FOR PROVIDING AN INORGANIC COATING TO AMMONIUM NITRATE-BASED PARTICLES

FIELD OF THE INVENTION

The invention relates to a method for providing an inorganic coating to ammonium nitrate (AN) based particles, in particular to ammonium nitrate-based particles for use as a fertilizer, as well as to an inorganic coating for ammonium nitrate-based particles per se. Such inorganic coating is suitable for providing macronutrients, micronutrients or a combination thereof to a particulate fertilizer. Furthermore, it confers desirable properties onto the ammonium nitrate-based particles, such as anti-caking properties, anti-swelling properties and resistance to thermo cycling.

The invention further relates to a particulate ammonium nitrate-based fertilizer, comprising the coated ammonium nitrate-based particles, e.g. prills and/or granules, having macro- and/or micronutrients in the coating.

BACKGROUND OF THE INVENTION

The invention relates to a method for providing an inorganic coating to ammonium nitrate-based particles, in particular to ammonium nitrate-based particles for use as a fertilizer. Such inorganic coating is suitable for providing macronutrients, micronutrients or a combination thereof to a particulate fertilizer.

Plants may obtain macronutrients, micronutrients or any combination thereof, amongst others, by the application of particulate fertilizers. Macronutrients are typically divided into primary nutrients (nitrogen, phosphorus, sulphur and potassium) and secondary nutrients (calcium, magnesium, and sulfur). Micronutrients (also referred to as trace elements) include boron, chlorine, copper, iron, manganese, molybdenum, and zinc.

As a first object, the invention is directed to the provision of an inorganic coating, suitable for providing micronutrients to a particulate fertilizer.

As a second object, the invention is directed to the provision of an inorganic coating, suitable for providing macronutrients, micronutrients or any combination thereof to a particulate fertilizer.

At present, there exist different possibilities to provide particulate fertilizers with macronutrients, micronutrients or a combination thereof.

A first possibility is to add macronutrients, micronutrients or a combination thereof into the fertilizer during the manufacturing process of the fertilizer particles, for instance before the fertilizer particles are formed. The disadvantage of this possibility is that some reactions between the added macro- or micronutrient components and the acids or other materials present may render some of the macro- or micronutrients unusable. When for instance zinc oxide (ZnO) comes into contact with phosphoric acid ($H_3PO_4$), insoluble $Zn_3(PO_4)_2$ is formed rendering the macro- or micronutrients unusable.

A second possibility is to coat the macro- or micronutrients on the fertilizer particles using a non-aqueous solution of the macro- or micronutrients, for instance an oil-based solution to which magnesium oxide ($MgO_2$), zinc oxide (ZnO), boric oxide ($B_2O_3$), another mineral alkaline or any combination thereof is added. However, addition of oil to the particulate fertilizer results in dilution of the fertilizer. The fertilizer particles furthermore become sticky and having a reduced flowability. Also, by using an oil in the coating, the amount of carbon is raised, consequently raising the explosion sensitivity of the particulate fertilizer.

A third possibility is to physically blend the fertilizer particles with specific particles of macro- or micronutrients. In that case, a blend is obtained often having particles with a different size, resulting in segregation of the particles. When spreading such a blend on the field by the farmer, a non-uniform distribution of the added nutrients is obtained.

A fourth possibility is to form an aqueous solution of the macro- or micronutrients and spraying these on the fertilizer particles. When applying said aqueous solution on hygroscopic particles such as ammonium nitrate (AN) particles, these particles will absorb the water of the aqueous solution, resulting in the free flowing fertilizer particles to swell, degrade, or in the worst case, turn into a wet mud.

PRIOR ART

U.S. Pat. No. 3,419,379 A (Goodale et al., 1968) discloses a water-resistant coating for ammonium nitrate ($NH_4NO_3$) granules in which the granules were first coated with desiccants like superphosphoric acid ($H_3PO_4$), sulfuric acid anhydride ($SO_3$) or oleum ($HNO_3$). The wet granules were then contacted with alkaline materials such as $NH_3$ (gas), MgO, or CaO in an equimolar or stoichiometric ratio. The reaction product of the acid with the alkaline material produced a coating around the granules which prevented them from caking, and retarded their dissolution on contact with moist soil. Since an equimolar ratio is used, the basic materials are reacted away with the strong acid to produce a sealing salt layer, consisting of, for instance, calcium sulphate, calcium phosphate, magnesium sulphate, etc. None of the coatings disclosed comprise micronutrients. The use of said desiccants in a commercial plant is cumbersome, has not been used commercially, and it is specifically indicated that neither the acid nor base components may react with the ammonium nitrate particles. None of the coatings disclosed comprise micronutrients.

FR 2 686 861 A (Thüring, 1993) describes a coating procedure which substitutes the traditional coating by sealing off the particulate fertilizers by a solid capsule. It provides the fertilizers with a better protection and prevents it more efficiently from caking than a traditional coating does. The coating procedure is carried out by spraying the particulate fertilizers with a first reagent in the form of a mineral alkaline, such as magnesium, calcium or barium oxide, followed by an aqueous solution of a second reagent, such as phosphoric, sulphuric, nitric or citric acid which reacts with the first reagent to form a solid capsule of a metal salt. The mineral alkaline is used in a 2 to 3 times stoichiometric amount. According to this patent document, contact between the aqueous acid and the granule is to be avoided to prevent the acid to form a slurry with the granule.

JP 2002-316888 A (Sumitomo Chemical CO Ltd) discloses a similar method and product wherein a granular product is first coated with a mineral powder, such as kaolin, talc, diatomaceous earth, activated clay, silicon sand, bentonite, zeolite and attapulgite clay, and subsequently with a liquid chosen from phosphoric acid, sulphuric acid, and nitric acid.

In WO 99/15480 A1 (Norsk Hydro, 1997), a method is disclosed for coating particulate fertilizers, wherein the method comprises the steps of applying an aqueous solution of a mineral acid, such as phosphoric acid, sulphuric acid, nitric acid, etc. and a mineral base such as magnesium oxide, calcium oxide, barium oxide, dolomite or a mixture of two or more onto the particulate fertilizer in order to reduce dust formation and caking during handling and storage. This combined treatment is performed only once to form a nutrient-containing shell of a metal salt or mixture of metal salts on the particulate fertilizer. The weight ratio between the mineral acid and the mineral base applied onto the particulate fertilizers is between 1.0 to 1.5. It is feasible to add color pigments and micronutrients to the shell. Although it is claimed in WO 99/15480 that this method is applicable to ammonium nitrate-based fertilizers, such as NPK, NK, AN, CAN or urea, difficulties will arise when applying this method to ammonium nitrate fertilizers such as AN and CN, since as a first step in the method, water (as an aqueous solution of a mineral acid) is applied to the particles, resulting in the hygroscopic ammonium nitrate taking up said water out of the aqueous solution, thus degrading the particles, and in the worst case resulting into a mud. It is noted that in WO 99/15480, only examples were given based on an NPK 17-17-17.

However, none of the above methods gives satisfactory results. Therefore, there exists a need to provide an ameliorated method for incorporating macro- or micronutrients or a combination thereof, in a particulate ammonium nitrate-based fertilizer, solving the aforementioned problems.

DETAILED DESCRIPTION OF THE INVENTION

Figure 1:
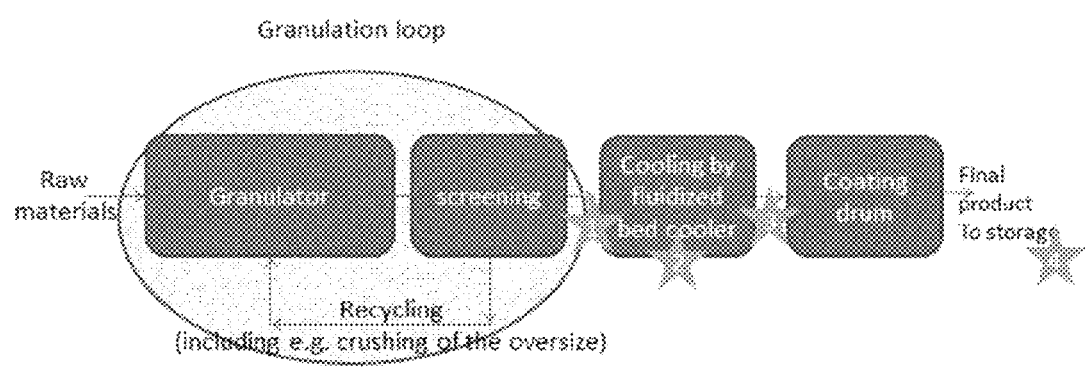
FIG. 1 illustrates the entry points/where to introduce the treatment according to the invention into a granulation process.

The inventors have now realized that an inorganic coating for ammonium nitrate-based particles can be provided, which is based, on the one hand, on the use of concentrated acids still containing some water, in particular less than 50 weight % of water, and on the other hand, on the use of non-stoichiometric amounts of the alkaline and acid components, wherein the amount of the alkaline component is in excess of the amount of the acid component.

According to a first aspect of the invention, a method is disclosed for providing an inorganic coating to ammonium nitrate-based particles, the method comprising the steps of:
a) applying a liquid concentrated mineral acid with a water content of less than 50 weight %, to the particles, in order to at least solubilize ammonium nitrate at the outer surface of the particles such that an acidified particle grasping layer is obtained, and
b) applying a solid mineral alkaline in powder form to the particles of step a) in order to react with the grasping layer of the particles to coat the acidified particle surface;

wherein the stoichiometric ratio of solid mineral alkaline in powder form to concentrated mineral acid is equal to or more than or 5:1.

Within the context of the invention, the stoichiometric ratio is defined as the ratio of an amount of a first compound (acid) completely reacting with another amount of a second compound (base). The stoichiometric ratio is equal to the molar ratio when one mole of a first compound reacts with one mole of a second compound. The stoichiometric ratio is equal to twice the molar ratio when two mole of a first compound (acid) reacts with one moles of a second compound (base), in particular an acid and a base to form a salt.

Without being bound by theory, the inventors believe that by the method according to the invention, the step of applying the liquid concentrated mineral acid with a water content of less than 50 weight %, to the particles, partly solubilizes the outer layer of the ammonium nitrate-based particles without dissolving the particles and producing a mud, thus producing a grasping layer, or "active" layer, while, by the subsequent step of applying a solid mineral alkaline in powder form to the particles, the particles of the solid mineral alkaline in powder form react with the grasping layer and are "glued" to the surface of ammonium nitrate-based particles by the salt formed between the acid in the grasping layer and the mineral alkaline component. Because only the surface of the particles of the solid mineral alkaline in powder form of reacts, even with very small particles, the reaction will never be stoichiometric and the mineral alkaline component will be present in excess over the acid component.

According to one embodiment of the invention, the stoichiometric ratio of solid mineral alkaline in powder form to concentrated mineral acid used for the grasping layer is equal to or more than 5:1, preferably more than 10:1, more preferably more than 15:1.

Within the context of this application, a liquid concentrated mineral acid is a non-organic acid or any mixture thereof. Sulphuric acid, nitric acid, hydrochloric acid and phosphoric acids are probably the most important commercial available concentrated mineral acids, though they are certainly not the only concentrated mineral acids within the context of this application. A mixture may contain any combination of concentrated mineral acids, with the proviso that the mixture has a water content of less than 50 weight % (based on the total weight of the mixture).

Within the context of this application, "concentrated" means having a water content of less than 50 weight %, either at STP (for example in a bottle or drum) or at any other combination of pressure and temperature. Concentrated mineral acids may be provided that have a lower water content at conditions deviating from STP, in particular at higher temperatures, or lower pressure. Some examples of commercially available mineral acids with different concentrations are shown in Table 1.

TABLE 1

Some concentrated mineral acids and their purity

| Name | Formula | Commercial concentrations (weight %) |
|---|---|---|
| Boric acid | $H_3BO_3$ | 20% |
| Hydrochloric acid | HCl | 32%, 36% |
| Hydrobromic acid | HBr | 48% |
| Hydrofluoric acid | HF | 50%, 60%, 70% |
| Perchloric acid | $HClO_4$ | 60%, 70% |
| Nitric acid | $HNO_3$ | 60% |

TABLE 1-continued

Some concentrated mineral acids and their purity

| Name | Formula | Commercial concentrations (weight %) |
|---|---|---|
| Phosphoric acid | $H_3PO_4$ | 85% (61.6% $P_2O_5$) |
| | | 75% (54% $P_2O_5$) |
| | | 62% (45% $P_2O_5$) |
| Sulphuric acid | $H_2SO_4$ | 96% |

The amount of water (or the relative lack of it) was found crucial to the invention. Too much water (more than 50 weight % in the acid) produced a too muddy particle and no effective grasping layer could be formed.

According to one embodiment of the invention, the liquid concentrated mineral acid is selected from the group of sulphuric acid ($H_2SO_4$), phosphoric acid ($H_3PO_4$), nitric acid ($HNO_3$), hydrofluoric acid (HF), boric acid ($H_3BO_3$), and mixtures thereof.

According to a favorable embodiment of the invention, the liquid concentrated mineral acid is selected from the group of sulfuric acid ($H_2SO_4$), phosphoric acid ($H_3PO_4$), nitric acid ($HNO_3$), and mixtures thereof.

Within the context of this application, a liquid concentrated mineral acid may also be a mixture of any one of the above mentioned acids, as long as the water content of the mixture is less than 50 weight %. In this way, for example, boric acid could be mixed with, for example, sulphuric acid, and boron could introduced into the ammonium nitrate-based particles, which is especially useful when the ammonium nitrate-based particles are used for fertilizer applications, as boron is a micronutrient.

One particular advantage of this method is that ammonium nitrate-based particles for fertilizer applications are provided with well dispersed nutrients and/or micronutrients using the ammonium nitrate-based particles as a support. Furthermore, the resulting ammonium nitrate-based fertilizer particles treated by the method according to the invention as described above have an increased resistance to thermo cycling, a reduced swelling and a reduced caking behavior.

The water content of the concentrated mineral acid is important as too much water will turn the ammonium nitrate-based particles into a mud or sticky mass. The amount of water was determined to be at most 50 weight %. In most concentrated mineral acids that are commercially available, such water content is lower (see Table 1 above). It is important that, contrary to WO 99/15480, no aqueous solution of the concentrated mineral acid is used, but the concentrated mineral acid per se. According to one embodiment the water content of the concentrated mineral acid is less than 40 weight %, preferably less than 30 weight %, more preferably less than 20 weight % and most preferably less than 10 weight %.

According to one embodiment of the invention, the solid mineral alkaline is selected from the group of magnesium oxide (MgO), zinc oxide (ZnO), barium oxide (BaO), calcium oxide (CaO), calcium hydroxide (Ca(OH)$_2$) limestone, magnesite (MgCO$_3$), calcite, dolomite (CaMg(CO$_3$)$_2$), chalk, caustic soda, and any mixture thereof. Chalk is a soft, white, porous sedimentary rock, a form of limestone composed of the mineral calcite which is calcium carbonate (CaCO$_3$).

According to one embodiment of the invention, when the ammonium nitrate-based particles are to be used as fertilizer, the solid mineral alkaline in powder form is selected from the oxides, hydroxides or carbonates of secondary nutrients or micronutrients, or a combination thereof. Examples thereof are zinc oxide (ZnO), magnesium oxide (MgO), copper oxide (CuO), cupper carbonate (CuCO$_3$), manganese (II)oxide (MnO), manganese dioxide (MnO$_2$), barium oxide (BaO), calcium oxide (CaO), colemanite (CaB$_3$O$_4$(OH)$_3$H$_2$O).

According to one embodiment of the invention, the solid mineral base in powder form is preferably selected from the oxides, hydroxides or carbonates of micronutrients, which micronutrients include at least boron, chlorine, copper, iron, manganese, molybdenum and zinc.

According to one embodiment of the invention, both the solid mineral base in powder form and the concentrated mineral acid provide for the micronutrients, which micronutrients include at least boron, chlorine, copper, iron, manganese, molybdenum and zinc.

The preferred average particle size of the solid mineral alkaline in powder form is less than 100 μm, preferably between 1 and 30 μm.

According to one embodiment, 1 to 6 weight % of solid mineral alkaline in powder form and 0.1 to 5 weight % of concentrated mineral acid is used, based on the weight of the ammonium nitrate-based particles, with the proviso that the stoichiometric ratio of solid mineral alkaline in powder form to concentrated mineral acid is equal to or more than 5:1.

According to one embodiment of the invention, 2.5 to 4 weight % of solid mineral alkaline in powder form and 0.5 to 2 weight % of concentrated mineral acid is used, based on the weight of the ammonium nitrate-based particles, with the proviso that the stoichiometric ratio of solid mineral alkaline in powder form to concentrated mineral acid is equal to or more than 5:1.

According to one embodiment of the invention, the concentrated mineral acid is applied to the ammonium nitrate-based particles by spraying the concentrated mineral acid onto the ammonium nitrate-based particles.

According to one embodiment of the invention, the method is performed in a device, suitable for coating particles, by sequentially executing step a) followed by step b), or by sequentially executing step b) followed by step a), or by simultaneously executing steps a) and b). According to the third option, the mineral acid and the solid mineral alkaline in powder form can be added simultaneously to the ammonium nitrate-based particles, but a more preferred option is to first add the concentrated mineral acid to the particles (step a), and consequently the excess of solid mineral alkaline in powder form (step b) to form the grasping layer.

The application of the concentrated mineral acid and the excess of solid mineral base in powder form can be performed in any device, suitable for coating ammonium nitrate-based particles, such as a drum or the like.

According to one embodiment of the invention, a further step c) is provided following the combination of steps a) and b), wherein a further amount of concentrated mineral acid with a water content of less than 50% is added to the ammonium nitrate-based particles. This step may serve, among others, to bind the particles of the solid mineral alkaline in powder form together after they have been attached to the ammonium nitrate-based particles. According to one embodiment, 0.1 to 5 weight % of concentrated mineral acid is used, based on the weight of the ammonium nitrate-based particles. Preferably the stoichiometric ratio of solid mineral alkaline in powder form to the total amount of concentrated mineral acid added (step a plus step c) is equal to or more than 5:1.

In the method according to the invention, typically a coating drum or a rotating blender or a pan, i.e. standard techniques used in the fertilizer industry, are applied to perform steps a), b) and c). A cement truck, with its rotating section, can also be used to perform the method according to the invention. This cement truck then is used as a mobile blending unit.

The production process can be performed as a batch process as well as a continuous process. In a batch process, the different compounds are typically introduced one by one, in the following sequence:

Particulate ammonium nitrate-based particles
Concentrated mineral acid
Excess of solid mineral alkaline in powder form
If necessary, post-acidification with concentrated mineral acid.

A typical setup is outlined in FIG. 1 for the incorporation of the process steps into a granulation plant. The stars in the figure represent typical entry points where to introduce the treatment according to the invention into the granulation process, in particular after the granulation loop.

1=between screening and treatment (here cooling+coating section)
2=as a step between two cooling steps
3=between the cooling step and the coating step
4=once the product is finished (typically a post treatment in the market to customize the product).

This presents the advantage that the product can be dedusted with the aid of the air used in the cooler. The dust, if any, can be recovered in e.g. cyclones and recycled into the treatment, or at any other place in the process. Moreover, the reaction between the acid and the powder often generates water as a byproduct of the reaction. This water can then be partially or totally dried out in the cooler. The removal of the water is relatively easy to perform because it is formed at the surface of the particles. In the treatment according to the invention, typically performed in a rotating drum, the way of applying the powder and the acid is optimized to get the maximum efficiency of treatment and to limit the need for a separate dedusting step, which is option described here.

According to one embodiment of the invention, the ammonium nitrate-based particles are pretreated by drying or preheating. Preferably, the ammonium nitrate-based particles should contain a very low amount of water, or at least an amount which is less than 2, 1.5, 1, 0.9, 0.8, 0.7, 0.6, 0.5, 0.4, 0.3, 0.2, 0.1 weight % or less, relative to the weight of the ammonium nitrate-based particle.

According to a second aspect of the invention, an inorganic coating for ammonium nitrate-based particles is provided, produced by a method, comprising the steps of:
a) applying a liquid concentrated mineral acid with a water content of less than 50 weight %, to the particles, in order to at least solubilize ammonium nitrate at the outer surface of the particles such that an acidified particle grasping layer is obtained, and
b) applying a solid mineral alkaline in powder form to the particles of step a) in order to react with the grasping layer of the particles to coat the acidified particle surface; wherein the stoichiometric ratio of solid mineral alkaline in powder form to concentrated mineral acid is equal to or more than 5:1.

More in general, an inorganic coating for ammonium nitrate-based particles is provided comprising the reaction product of a liquid concentrated mineral acid with a water content of less than 50%, a solid mineral alkaline in powder form, and ammonium nitrate, wherein the stoichiometric ratio of solid mineral alkaline in powder form to concentrated mineral acid to arrive at said coating is equal to or more than 5:1.

According to a third aspect of the invention, a particulate ammonium nitrate-based fertilizer, comprising ammonium nitrate-based particles is provided, wherein the ammonium nitrate-based particles comprise an inorganic coating produced by a method, comprising the steps of:
a) applying a liquid concentrated mineral acid with a water content of less than 50 weight %, to the particles, in order to at least solubilize ammonium nitrate at the outer surface of the particles such that an acidified particle grasping layer is obtained, and
b) applying a solid mineral alkaline in powder form to the particles of step a) in order to react with the grasping layer of the particles to coat the acidified particle surface; wherein the stoichiometric ratio of solid mineral alkaline in powder form to concentrated mineral acid is equal to or more than 5:1.

More in general, a particulate ammonium nitrate-based fertilizer, comprising ammonium nitrate-based particles, is provided, wherein the ammonium nitrate-based particles comprise an inorganic coating comprising the reaction product of a liquid concentrated mineral acid with a water content of less than 50 weight %, a solid mineral alkaline in powder form, and ammonium nitrate, wherein the stoichiometric ratio of solid mineral alkaline in powder form to concentrated mineral acid to arrive at said coating is equal to or more than 5:1.

Within the context of this application, with ammonium nitrate-based fertilizer is meant a fertilizer comprising at least ammonium nitrate, in particular a CAN fertilizer. For the purpose of this invention, an ammonium nitrate-based fertilizer is defined as a fertilizer composition comprising at least 50 weight % of ammonium nitrate, preferably at least 60 weight %, more preferably at least 70 weight %, even more preferably at least 80 weight %, most preferably at least 90 weight %, relative to the total weight of the fertilizer composition. A typical fertilizer formula is the so-called calcium ammonium nitrate (CAN), i.e. a mix of ammonium nitrate with a carbonaceous filler (limestone, dolomite) and with a maximum AN-content of 80 weight %. Such CAN fertilizer has moreover the advantage of being well-balanced regarding soil pH, avoiding the natural acidification due to the conversion of ammonium nitrogen into nitrate nitrogen to be assimilated by the plants. Many other ammonium nitrate-based fertilizers exist, not only straight nitrogen (N) fertilizers (with different degrees of N dilution by a filler or containing secondary nutrients such as e.g. Sulphur), but also NPK (indifferently NPK, NP, NK) and especially high N-NPK fertilizers. Therefore, according to one embodiment of the invention, the particulate ammonium nitrate-based fertilizer is selected from the group of ammonium nitrate fertilizer, calcium ammonium nitrate fertilizer, NPK (indifferently NPK, NP, NK) fertilizer, and high N-NPK fertilizer.

According to a fourth aspect of the invention, there is disclosed the use of the inorganic coating according to the invention, for the incorporation of macronutrients, micronutrients or a combination thereof in a particulate ammonium nitrate-based fertilizer, wherein the liquid concentrated mineral acid and the solid mineral alkaline in powder form are the source of any one of the macronutrients and the micronutrients. Preferably, the solid mineral alkaline in powder form is selected from the oxides, hydroxides or carbonates of secondary nutrients or micronutrients, or a combination thereof. Preferably, the liquid concentrated mineral acid is an acid containing a macronutrient, either by its constitution (nitric acid delivering nitrogen, phosphoric acid delivering phosphorus or sulphuric acid delivering sulphur), or by the fact that the acid is used as a solvent for other components (such as boric acid, delivering boron, or dissolved or dispersed components, preferably added as sulphates or nitrates, such as zinc sulphate, cupper nitrate, iron sulphate, iron nitrate, and the like).

Surprisingly, it was also found that the coating increased the resistance to thermo cycling of an ammonium nitrate-based fertilizer, reduced swelling of an ammonium nitrate-based fertilizer and reducing caking of an ammonium nitrate-based fertilizer, even after moisture pickup.

EXAMPLES

Example 1

In the Table 2 below, a number of possible combinations of mineral acids and solid mineral alkaline in powder form are shown, wherein the mineral acid and the solid mineral alkaline in powder form are possible source for any of the macro- and micronutrients.

TABLE 2

Combinations of mineral acids and solid mineral alkaline in powder form

| Mineral acid | Typical $H_2O$ conc. (weight %) | Mineral alkaline in powder form | Primary macro-nutrient | Secondary macro-nutrient | Micro-nutrient |
|---|---|---|---|---|---|
| Sulphuric acid | <5 | Magnesium oxide | — | S, Mg | — |
| Phosphoric acid | 20-25 | Magnesium oxide | P | Mg | — |
| Sulphuric acid | <5 | Zinc oxide | — | S | Zn |
| Sulphuric acid | <5 | Zinc oxide and Magnesium oxide | — | Mg | Zn |
| Sulphuric acid | <5 | Dolomite | — | S, Ca, Mg | — |
| Sulphuric acid/ Boric acid | 50 | Zinc oxide | — | S | B, Zn |
| Nitric acid | <45 | Magnesium oxide | N | Mg | — |

Example 2

An calcium ammonium nitrate particulate fertilizer (Yara, Sluiskil) was first treated with concentrated sulphuric acid (96% purity) (Merck) and subsequently treated with MgO powder.

Theoretically, if equimolar (or stoichiometric) amounts would have been used, one would have to dose 0.41 g of MgO for each gram of sulphuric acid added (leading to a weight ratio alkaline/acid of 0.4. In the experiment, 0.2 weight % of sulphuric acid (based on the total mass of the fertilizer) was added, followed by 6 weight % of MgO, amounting to a stoichiometric ratio of 74 (weight ratio of 30). After the mixing, the actual amounts were determined to be 0.2 weight % of sulphuric acid and 2.95 weight % of MgO, which leads to a stoichiometric ratio of 36 (weight ratio of 15). The remaining MgO was not "glued" to the ammonium nitrate-based particles.

In a further step, 0.8 weight % of sulphuric acid was dosed to the ammonium nitrate-based particles of the previous step, such that the total dosage of sulphuric acid was 1 weight %, amounting to a stoichiometric ratio of 15 (weight ratio of 6). After the mixing, the actual amounts were determined to be 0.67 weight % of sulphuric acid and 2.95 weight % of MgO, which leads to a stoichiometric ratio of 11 (weight ratio of 4). This leads to the conclusion that not more MgO could be bound to the ammonium nitrate-based particles using the further step, but that the MgO was further glued together and a more stable coating was produced.

Example 3: Swelling and Caking Tendency

Swelling was determined using EU standard tests, where the volume expansion of the fertilizer, expressed in %, is measured after submitting the fertilizer sample to 5 thermo cycles between 25 to 50° C.

Caking tendency was determined using the in-house standard test where a sample of product is submitted to a fixed pressure for a fixed time. As a consequence, a cake is formed, and the pressure required to break this cake of granules is an indication of the caking tendency. It is expressed in Newton, the lower the better, and must be understood as:

Below 735 N=good to very good quality quality
Between 735 N and 1470 N=product has some caking tendency
Above 1470 N=the product is caking.

CAN granules (Yara, Sluiskil) were sprayed with 1 weight % of concentrated sulphuric acid (purity 96 weight %) in a concrete mixer and MgO powder was added. The method according to the invention comprised the following steps:
1) first a first amount (0.2 weight %) of concentrated sulphuric acid wad added to activate the surface of the granule and/or enhance the adherence of the powder;
2) next, the MgO powder was added;
3) finally, a second amount (0.8 weight % sulphuric acid) of sulphuric acid was added, in order to strengthen the layer formed on the surface, to cement it in a way, and also to react further the MgO.

Figure 2:
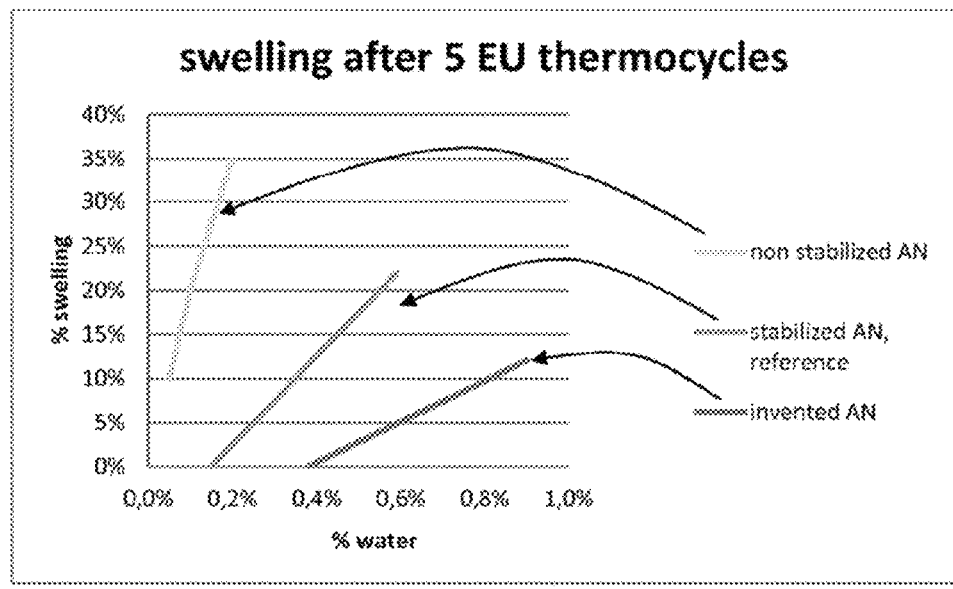
FIG. 2 illustrates the swelling tendency of a non-stabilized calcium ammonium nitrate particles (not treated), a commercial grade calcium ammonium nitrate particles stabilized with aluminum sulphate and calcium ammonium nitrate particles coated with the coating according to the invention.
Figure 3:
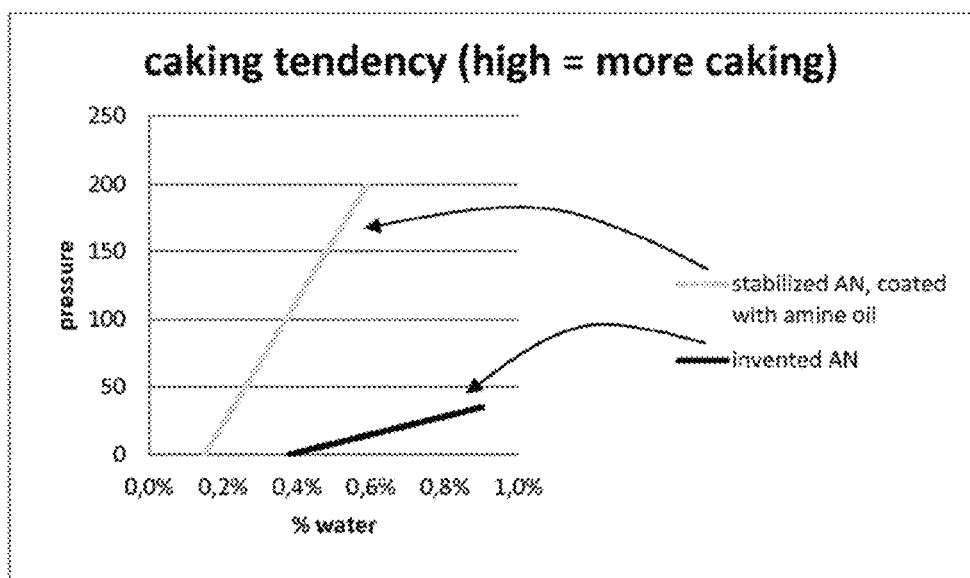
FIG. 3 illustrates the caking tendency of a non-stabilized calcium ammonium nitrate particles (not treated), a commercial grade calcium ammonium nitrate particles stabilized with aluminum sulphate and coated with an amine oil and calcium ammonium nitrate particles coated with the coating according to the invention.

The results are shown in FIGS. 2 and 3. The results are compared with non-stabilized calcium ammonium nitrate (not treated) and a commercial grade, stabilized with aluminum sulphate and coated with an amine oil. As can be seen from FIGS. 2 and 3, the CAN, coated with the coating according to the invention is highly resistant to swelling and has a low caking tendency, even after moisture pickup.

The invention claimed is:
1. A method for providing an inorganic coating to ammonium nitrate-based particles, the method comprising the steps of:
   a) applying a liquid concentrated mineral acid with a water content of less than 50 weight %, to the particles, in order to at least solubilize ammonium nitrate at the outer surface of the particles and obtain an acidified particle grasping layer, and
   b) applying a solid mineral alkaline in powder form to the particles of step a) in order to react with the grasping layer of the particles to coat the acidified particle surface;
   wherein the stoichiometric ratio of solid mineral alkaline in powder form to concentrated mineral acid is equal to or more than 5:1.
2. The method according to claim 1, wherein the stoichiometric ratio of solid mineral alkaline in powder form to concentrated mineral acid is more than 10:1.
3. The method according to claim 1, wherein the concentrated mineral acid is selected from the group consisting of sulphuric acid (H$_2$SO$_4$), phosphoric acid (H$_3$PO$_4$), nitric acid (HNO$_3$), hydrofluoric acid (HF), boric acid (H$_3$BO$_3$), and mixtures thereof.

4. The method according to claim 1, wherein the concentrated mineral acid is selected from the group consisting of sulfuric acid (H$_2$SO$_4$), phosphoric acid (H$_3$PO$_4$), nitric acid (HNO$_3$), and mixtures thereof.

5. The method according to claim 1, wherein the water content of the concentrated mineral acid is less than 40 weight %.

6. The method according to claim 1, wherein the solid mineral alkaline is selected from the group consisting of magnesium oxide, zinc oxide, barium oxide, calcium oxide, calcium hydroxide, limestone, magnesite, calcite, dolomite, chalk, caustic soda, and mixtures thereof.

7. The method according to claim 1, wherein 1 to 6 weight % of solid mineral alkaline in powder form and 0.1 to 5 weight % of concentrated mineral acid are applied, based on the weight of the ammonium nitrate-based particles.

8. The method according to claim 7, wherein 2.5 to 4 weight % of solid mineral alkaline in powder form and 0.5 to 1 weight % of concentrated mineral acid are applied, based on the weight of the ammonium nitrate-based particles.

9. The method according to claim 1, wherein the concentrated mineral acid is applied to the ammonium nitrate-based particles by spraying.

10. The method according to claim 1, wherein the method is performed in a device which is capable of coating particles, by sequentially executing step a) followed by step b), or by sequentially executing step b) followed by step a), or by simultaneously executing steps a) and b).

11. The method according to claim 1, further comprising step c) following the combination of steps a) and b), wherein a further amount of concentrated mineral acid with a water content of less than 50 weight % is added to the ammonium nitrate-based particles.

12. The method according to claim 1, wherein the ammonium nitrate-based particles are pretreated by drying or preheating.

13. An inorganic coating for ammonium nitrate-based particles, comprising the reaction product of a liquid concentrated mineral acid with a water content of less than 50 weight %, a solid mineral alkaline in powder form, and ammonium nitrate, wherein the stoichiometric ratio of solid mineral alkaline in powder form to concentrated mineral acid to arrive at said coating is equal to or more than 5:1.

14. The inorganic coating according to claim 13, wherein the coating is provided by the following method:
  a) applying a liquid concentrated mineral acid with a water content of less than 50 weight %, to the particles, in order to at least solubilize ammonium nitrate at the outer surface of the particles such that an acidified particle grasping layer is obtained, and
  b) applying a solid mineral alkaline in powder form to the particles of step a) in order to react with the grasping layer of the particles to coat the acidified particle surface;
  wherein the stoichiometric ratio of solid mineral alkaline in powder form to concentrated mineral acid is equal to or more than 5:1.

15. The inorganic coating according to claim 13, wherein the coating is formed from sulphuric acid and magnesium oxide, phosphoric acid and magnesium oxide, sulphuric acid and zinc oxide, sulphuric acid, zinc oxide and magnesium oxide, sulphuric acid and dolomite, sulphuric acid, boric acid and zinc oxide, or nitric acid and magnesium oxide.

16. A particulate ammonium nitrate-based fertilizer, comprising ammonium nitrate-based particles comprising an inorganic coating according to claim 13.

17. The particulate ammonium nitrate-based fertilizer according to claim 16, wherein the particulate ammonium nitrate-based fertilizer is selected from the group consisting of ammonium nitrate fertilizer, calcium ammonium nitrate fertilizer, NPK fertilizer, NP fertilizer and NK fertilizer.

18. A particulate ammonium nitrate-based fertilizer according to claim 16, wherein the coating comprises an acidified particle grasping layer, formed from a concentrated mineral acid with a water content of less than 50 weight % and a solid mineral alkaline in powder form, wherein the concentrated mineral acid or the solid mineral base are the source of at least one micronutrient selected from the group consisting of boron, chlorine, copper, iron, manganese, molybdenum and zinc, and wherein the stoichiometric ratio of solid mineral alkaline in powder form to concentrated mineral acid is equal to or more than 5:1.

19. A method for reducing swelling of an ammonium nitrate-based fertilizer, the method comprising applying the inorganic coating according to claim 13 on a particulate ammonium nitrate-based fertilizer.

20. A method for reducing caking of an ammonium nitrate-based fertilizer, the method comprising applying the inorganic coating according to 13 on a particulate ammonium nitrate-based fertilizer.

* * * * *